Figure 2:
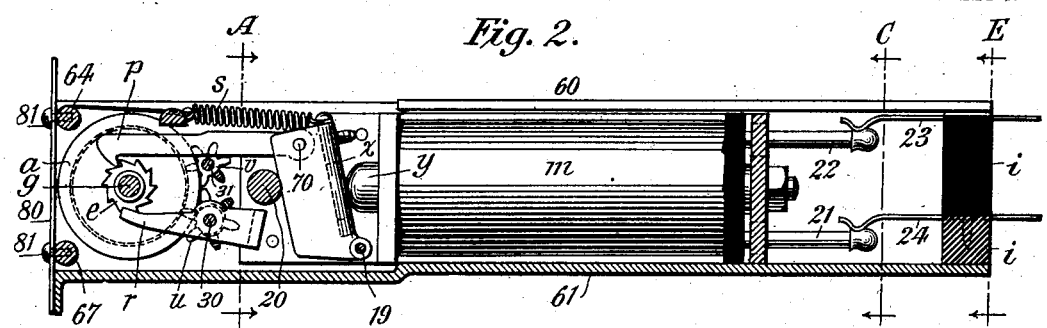

No. 740,889. PATENTED OCT. 6, 1903.
B. F. MERRITT.
TIMING DEVICE FOR TELEPHONE SWITCHBOARDS.
APPLICATION FILED JAN. 27, 1903.
NO MODEL. 3 SHEETS—SHEET 1.

WITNESSES:
C. E. Ashley
A. M. Donlevy

INVENTOR
Benjamin F. Merritt
By his Attorney
Wm. B. Vansize

No. 740,889. PATENTED OCT. 6, 1903.
B. F. MERRITT.
TIMING DEVICE FOR TELEPHONE SWITCHBOARDS.
APPLICATION FILED JAN. 27, 1903.
NO MODEL. 3 SHEETS—SHEET 2.

WITNESSES:
C. E. Ashley
A. M. Donlevy

INVENTOR
Benjamin F. Merritt
By his Attorney

No. 740,889. PATENTED OCT. 6, 1903.
B. F. MERRITT.
TIMING DEVICE FOR TELEPHONE SWITCHBOARDS.
APPLICATION FILED JAN. 27, 1903.
NO MODEL.
3 SHEETS—SHEET 3.
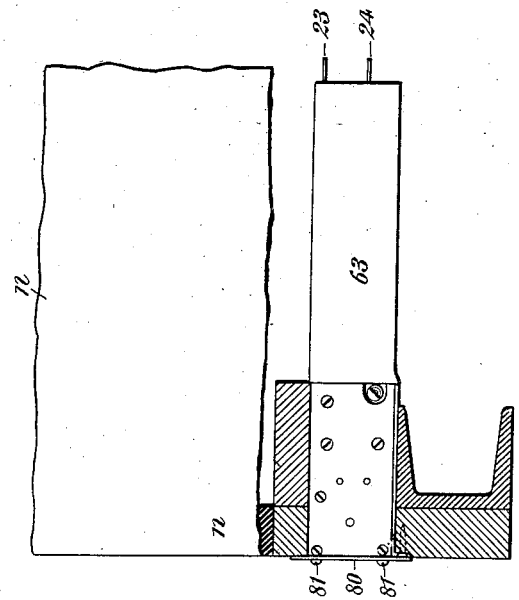
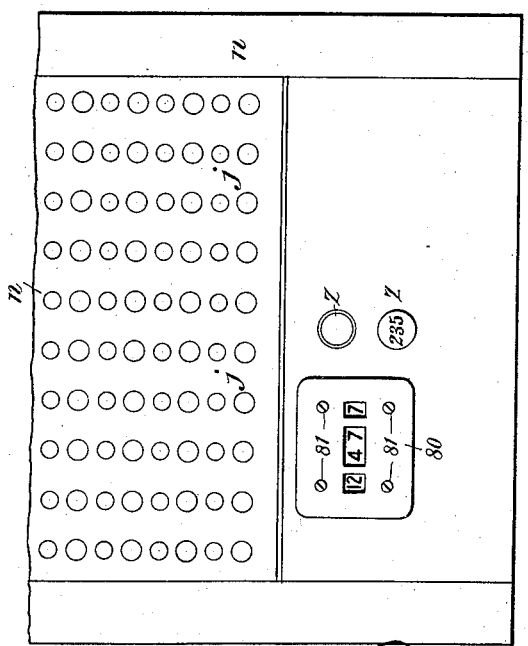
WITNESSES:
C. E. Ashley
A. M. Donlevy.
INVENTOR
Benjamin F. Merritt
By his Attorney, No. 740,889. Patented October 6, 1903.

UNITED STATES PATENT OFFICE.

BENJAMIN F. MERRITT, OF EAST ORANGE, NEW JERSEY.

TIMING DEVICE FOR TELEPHONE-SWITCHBOARDS.

SPECIFICATION forming part of Letters Patent No. 740,889, dated October 6, 1903.

Application filed January 27, 1903. Serial No. 140,752. (No model.)

*To all whom it may concern:*

Be it known that I, BENJAMIN F. MERRITT, a citizen of the United States, and a resident of East Orange, in the county of Essex, State of New Jersey, have made certain new and useful Improvements in Timing Devices for Telephone-Switchboards, of which the following is a specification.

This invention relates to a mechanical device for indicating time in hours, minutes, and tenths or decimal parts of a minute.

The object of the invention is to provide a means for timing telephonic conversation and indicating the elapsed time even when of extreme brevity, such indication being in hours, minutes, and decimal divisions of a minute for ready valuation in a decimal currency.

A further object of the invention is to provide a positive direct action for advancing the timing device step by step that shall not be subject to electric or magnetic disturbance when in an exposed position among apparatus, terminals, and connections, as in a telephone-switchboard.

The invention includes a series of four rotating wheels or disks, each bearing numerals upon its periphery. Progressive movement is applied to the first wheel, which periodically advances the second, the second advancing the third, and the third advancing the fourth, the four wheels respectively indicating tenths of minutes, units of minutes, tens of minutes, and hours. The progressive movement is initially applied to the tenths-of-minutes wheel through a propelling pawl and ratchet. The pawl is operated by an electromagnet in an electric circuit containing a circuit-closing device operated by a clock beating seconds. The circuit-closing device in this clock is arranged and constructed to close the circuit ten times per minute. This advances the first wheel of the indicating device ten equal steps per minute. Said first wheel then advances the minute-wheel once per minute until ten steps have been taken by the second wheel, when both the second and the third wheels are advanced. The third or tens-of-minutes wheel is advanced six steps per hour, and the fourth or hour-wheel is advanced one step for each semirotation of the third wheel.

The device employed for advancing one wheel one step at fixed points in the rotation of the adjacent wheel consists of a pinion having an even number of teeth alternately wide and narrow. This pinion is located so as to engage on the pitch-line with a toothed wheel fixed to the driven wheel. A one-notch disk is fixed to the driving-wheel. A broad tooth of the pinion rides upon the periphery of this disk and drops into the notch periodically. A disk having two teeth is fixed to the one-notch disk. The teeth straddle the notch. When the broad tooth drops into the alined slot, due to the coincidence of the notched disk, the toothed wheel, and a broad tooth of the pinion, the two teeth of the added disk referred to couple the preceding narrow tooth of the pinion with a tooth of the notched wheel and the driving and the driven wheels step ahead together.

To provide for advancing one wheel ten steps for a complete rotation and the adjacent wheel operated thereby twelve steps for a complete rotation, as is the case with the units-of-minutes wheel and the tens-of-minutes wheel, I provide a gear-wheel having twenty-four teeth fixed to one and a gear-wheel having twenty teeth fixed to the other. Each wheel is advanced two teeth for each step. A pinion is located in position to engage the teeth of the tens-of-minutes wheel. This pinion is held and then advanced by the units-of-minutes wheel.

The accompanying drawings illustrate my invention.

Figure 1:
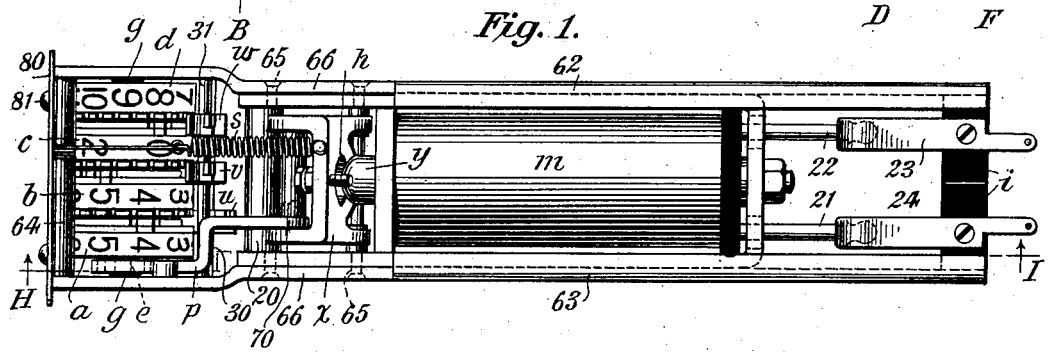
Figure 3:
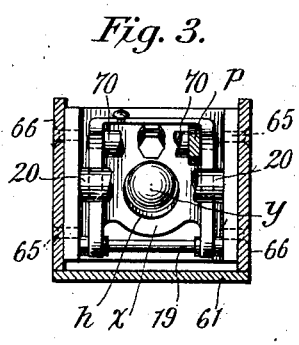
Figure 4:
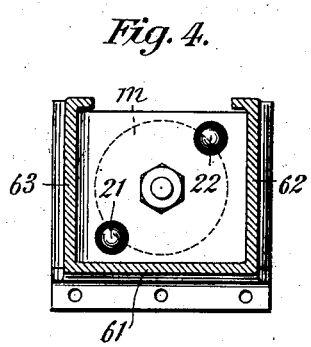
Figure 5:
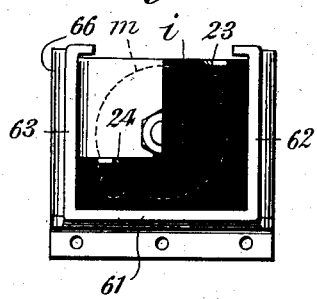
Figure 6:
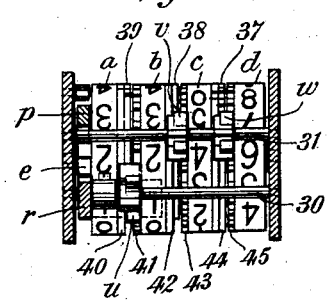
Figure 7:
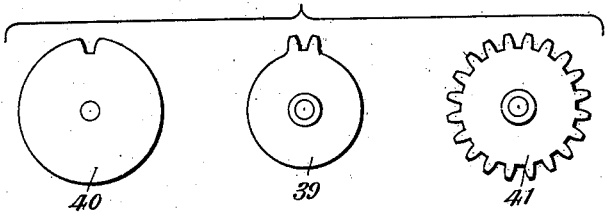
Figures 10, 11:
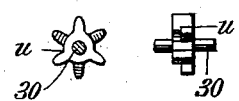
Figure 8:
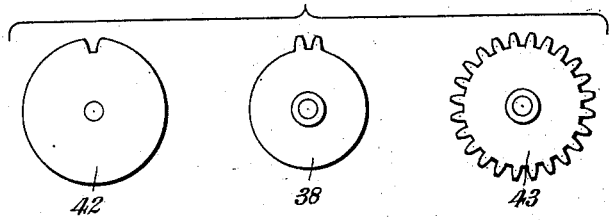
Figure 9:
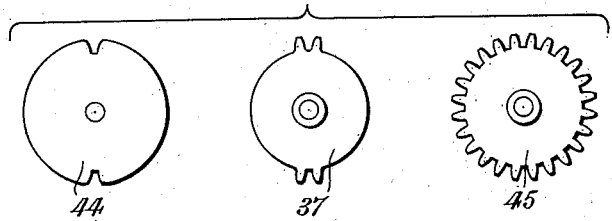
Figure 12:
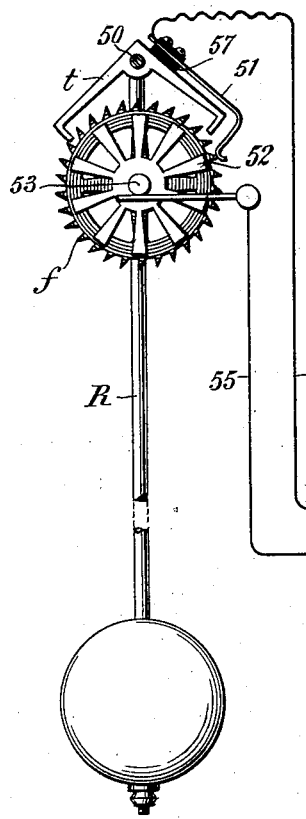

Figure 1 is a top plan view of the indicating device removed from its case and support. Fig. 2 is a side elevation on line H I, Fig. 1. Fig. 3 is a cross-section on line A B, Fig. 2. Fig. 4 is a cross-section on the line C D, Fig. 2. Fig. 5 is a rear view on the line E F, Fig. 2. Fig. 6 is a rear view of the series of indicating-wheels with the pinions, coöperating disks, and toothed wheels in position. Fig. 7 shows the toothed wheel and disks controlling the connection between the first and second wheels; Fig. 8, the same parts controlling the connection between the second and third wheels, and Fig. 9 similar parts controlling the connection between the third and fourth wheels. Fig. 10 is a face view of one of the pinions. Fig. 11 is an edge view of one of the pinions. Fig. 12 shows a pendulum beating seconds with a circuit-closer operating ten times per minute, the electric circuit, and the propelling-magnet for the time-indicating mechanism. Fig. 13 shows the usual arrangement of telephone-switchboard with time-indicating device incased in the board. Fig. 14 is a side view of the same, the board broken away to show the timing device.

There are four wheels or disks $a\ b\ c\ d$. $a$, Figs. 1 and 6, indicates tenths of minutes. $b$ indicates units of minutes. $c$ indicates tens of minutes. $d$ indicates the hour. On the periphery of wheel $a$ are figures from "1" to "9" and "0" inclusive. The figures on the wheel $b$ are the same. The figures on the wheel $c$ are "1, 2, 3, 4, 5, 0." These occur successively in duplicate. On the wheel $d$ are the figures "1" to "12," inclusive. The wheel $a$ is advanced step by step ten times per minute. The four wheels are on a shaft $g$. Fixed to the wheel $a$ is a ratchet-wheel $e$. A pawl $p$, hinged at 70 to the armature $x$ of magnet $m$, advances the wheel $a$, as will be described. $r$ is a holding-pawl for wheel $e$. The armature $x$ is pivoted at 19 upon a shaft having bearings in the sheet-metal frame composed of four plates or parts 60 61 62 63. It has a back-stop 20. Within the frame is fixed the magnet $m$. Its core $y$ projects into a hole $h$ in armature $x$, Fig. 3. The coil of magnet $m$ terminates in metal pins 21 22 in position to engage with the fixed springs 23 24, fixed to the metal inclosing case 66 through the medium of the insulating-plate $i$. The springs 23 24 form terminals of the operating-circuit to be described. The armature $x$ is retracted by a spring $s$, fixed to the crossbar 64. The wheel $a$, as stated, is advanced one-tenth of a rotation each time the pawl $p$ engages a tooth of ratchet-wheel $e$ in taking its attracted position responsive to a current impulse in the magnet $m$. The movement of the wheel $a$ is communicated to the wheel $b$ one step for each revolution. The means for accomplishing this consists of a pinion $u$, (shown in Figs. 10 and 11,) located upon the shaft 30, Fig. 6. Attached to the wheel $a$ is a disk 40, Fig. 7, having one notch. This notched disk 40 is fixed to the surface of the wheel $a$. The disk 39, Fig. 7, with its two teeth, is fixed against the disk 40, so that the notch in 40 occurs between the teeth in 39. The toothed wheel 41, Fig. 7, having twenty teeth, is fixed to the adjacent surface of the wheel $b$. By reference to Figs. 10 and 11 it will be seen that the pinion $u$ has six teeth alternately wide and narrow. This pinion $u$ is on shaft 30. As wheel $a$ rotates a broad tooth of pinion $u$ rides upon the periphery of diks 40. When the broad tooth of pinion $u$ drops into the alined teeth of disk 40, disk 39, and wheel 41, the preceding narrow tooth of pinion $u$ couples disk 39 and wheel 41, thus advancing wheel 41 and wheel $b$ one space—that is, one-tenth of a revolution—because it is a wheel representing units of minutes, which when ten have accumulated advances the tens-of-minutes wheel one step. This tens-of-minutes wheel has twelve figures upon its periphery "1, 2, 3, 4, 5, 0," and this arrangement is duplicated, so that whereas the wheel $b$ is moved ten steps per revolution the wheel $c$ must be moved twelve steps in the same revolution. For this purpose the notched disk 42, Fig. 8, is fixed to the wheel $b$, and the disk 38 with two teeth, Fig. 8, is fixed to the disk 42 so that the two teeth occur upon opposite sides of the notch in 42. The wheel 43, having twenty-four teeth, is fixed to the adjacent surface of the wheel $c$. Once in each rotation of the wheel $b$ the pinion $v$ on the shaft 31, a detail of which is like that shown in Figs. 10 and 11, advances the wheel $c$ one step. This is due to the alined slot in disk 42, disk 38, and wheel 43 permitting a broad tooth in pinion $v$ to drop, when the preceding narrow tooth couples disk 38 and wheel 43 to advance wheel 43 one step in addition to the step due to the movement of the broad tooth first referred to. This movement is similar to that described in respect to wheel $a$, except that the wheel $c$ is advanced twelve steps or figures, while the wheel $a$ is advanced ten steps or figures. The wheel $c$ advances the wheel $d$ twice for each complete rotation of wheel $c$. For this purpose the disk 44, Fig. 9, notched at diametrically opposite points, is fixed to the wheel $c$. The disk 37, with two teeth at each of two diametrically opposite points, is fixed to the disk 44 so that the teeth of wheel 37 straddle the openings in 44. The wheel 45 has twenty-four teeth and is fixed to the adjacent surface of the wheel $d$. There is a pinion $w$ on the shaft 31, the detail of its construction being like that shown in Figs. 10 and 11. When a broad tooth of pinion $w$ drops into the alined slot in disk 44, disk 37, and wheel 45, the preceding narrow tooth couples disk 37 and wheel 45, and the wheel $d$ is advanced one step or the distance of two teeth of the gear-wheel 45. The magnet $m$ receives an impulse of electricity and attracts its armature ten times per minute. The circuit-closer for accomplishing this is placed upon a rotating shaft, such as the shaft 50, carrying the pendulum R of a clock beating seconds, for instance.

$t$ is the verge, pivoted at 50 and engaging the teeth of the escape-wheel $f$, which is on shaft 53. On the same shaft 53 are ten radial contacts arranged equidistant, their exterior ends being in the arc of a circle. Carried on the verge $t$ is a contact-finger 51, insulated from verge $t$ by a bushing 57. The radial arms 52 and the moving finger 51 are the two members of the circuit-closing device, which come in contact ten times each minute. The circuit extends from the battery 56 by the conductor 54 to finger 51, thence to an arm of wheel 52, and returns by the conductor 55 to the magnet $m$.

57 is a high resistance connecting the opposite terminals of the magnet $m$ and designed to prevent sparking at the circuit-closer.

The time-indicating device is enveloped in a shell or case of iron or steel 66, composed of separate plates united by cross-bars, like 64 and 67, and screws 65. It is inserted in a suitable aperture in the switchboard $n$ with the spring-jacks $j$ and annunciators $z$, which are each included in electrical circuits. The indicating device is also provided with a face-plate 80, Figs. 13 and 14, having suitable apertures for exposing a horizontal line of figures on the wheels $a\,b\,c\,d$. The face-plate is fixed to the case 66 of the instrument, and the screws 81 retain the device in position in the switchboard, as shown in Figs. 13 and 14.

In operation the time indications are immediately before the switchboard operator, forming part of the board, but not subject to disturbance by electric and magnetic influences. The indications are in hours, minutes, and tenths of a minute, so that a conversation between connected lines lasting one and one-tenth minutes would, if the cost rate be ten cents per minute, amount to eleven cents, and this is immediately apparent to all concerned without the necessity for computation. By making the time-indicator a part of the board it is always in the line of vision of the operator, and this constitutes a great aid to accuracy.

The switching apparatus for connecting circuits in pairs during conversation, including the spring-jacks and circuits, are old and well known and substantially like those shown and described in United States Letters Patent No. 300,144, June 10, 1884.

What I claim, and desire to secure by Letters Patent, is—

1. A time-indicator for telephone-switchboards, having in combination, a wheel $a$ with numerals 0 to 9 inclusive upon its periphery, a wheel $b$ also with numerals 0 to 9 inclusive upon its periphery, a wheel $c$ with two groups of numerals, each group extending from 0 to 5 inclusive, a wheel $d$ with numerals 1 to 12 inclusive upon its periphery, a common shaft for said wheels, a ratchet-wheel permanently fixed to wheel $a$, a propelling-pawl for positively advancing wheel $a$ step by step; a magnet and armature to actuate the propelling-pawl; a case of magnetic metal around the magnet, a one-notched disk 40 attached to wheel $a$, a disk 39 beside disk 40, the notch in disk 40 being in line with the space between the teeth of disk 39; a like notched disk 42, and a like toothed disk 38 attached to wheel $b$; a disk 44 with two diametrically opposite notches, and a disk 37 with two pairs of diametrically opposite teeth, the spaces between which correspond to the notches in disk 44, disks 44 and 37 being attached to wheel $c$, a pinion with alternate wide and narrow teeth between each adjacent pair of numeral-wheels and coöperating with said wheels and disks between the numeral-wheels, whereby the wheels $a$ and $b$ are coupled once during each rotation of wheel $a$, and whereby the wheels $b$ and $c$ are coupled once for each rotation of wheel $b$, and whereby the wheels $c$ and $d$ are coupled twice for each rotation of wheel $c$, a circuit for said magnet, a circuit-closer in said circuit, and a master-clock operating said closer at uniform intervals.

2. The combination of a switchboard containing subscribers' circuit-terminals, indicating devices, and spring-jacks arranged in close proximity, a time-indicating device, a magnet, armature, and circuit for operating the time-indicating device, said magnet of the time-indicating device being near to the switchboard telephone-circuits and spring-jacks, a magnetic metal anti-induction case for said magnet, exposed circuit-terminals for said magnet, a receptacle in the switchboard for the time-indicating device, and fixed circuit-terminals in said board registering with said exposed terminals.

3. The combination of a central-station telephone-switchboard containing subscribers' circuit-terminals, indicating devices and spring-jacks arranged in rows in close proximity, with a time-indicating device consisting of a series of wheels having numerals on their exposed peripheries, means for advancing said wheels periodically, consisting of a ratchet-wheel fixed to the first wheel of the series, a propelling-pawl therefor, an electromagnet for operating said pawl, an electric circuit for said magnet, a circuit-closer for said circuit, a master-clock operating said circuit-closer at intervals, means for coupling adjacent numeral-wheels at fixed intervals, a case of magnetic metal near to the spring-jacks for said time-indicating device protecting it from inductive disturbances, and having fixed, exposed circuit-terminals, a suitable socket or receptacle in said switchboard to receive the described case, and fixed circuit-terminals in said board registering with the circuit-terminals in said case substantially as described.

BENJAMIN F. MERRITT.

Witnesses:
 THEODORE L. CUYLER, Jr.,
 A. M. DONLEVY.